United States Patent
Machikoppa et al.

(10) Patent No.: US 11,516,302 B2
(45) Date of Patent: Nov. 29, 2022

(54) NETWORK SERVICE DISCOVERY

(71) Applicant: HEWLETT PACKARD ENTERPRISE DEVELOPMENT LP, Houston, TX (US)

(72) Inventors: Shashanka Suryanarayana Machikoppa, Bangalore (IN); Mahesh Venkateshwaran, Bangalore (IN); Edward Muniswamy Victor Vajravelu, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/223,695

(22) Filed: Apr. 6, 2021

(65) Prior Publication Data
US 2021/0392192 A1    Dec. 16, 2021

(30) Foreign Application Priority Data
Jun. 16, 2020   (IN) .............................. 202041025320

(51) Int. Cl.
*H04L 67/51* (2022.01)
*H04L 67/568* (2022.01)

(52) U.S. Cl.
CPC ............ *H04L 67/51* (2022.05); *H04L 67/568* (2022.05)

(58) Field of Classification Search
CPC ........................... H04L 67/16; H04L 67/2842
USPC ...................................................... 370/254
See application file for complete search history.

(56) References Cited

U.S. PATENT DOCUMENTS

| | | | |
|---|---|---|---|
| 6,266,694 B1 * | 7/2001 | Duguay | H04L 41/044 |
| | | | 709/227 |
| 9,806,945 B2 | 10/2017 | Atreya et al. | |
| 9,853,875 B1 | 12/2017 | Oztaskent et al. | |
| 10,148,769 B2 | 12/2018 | Lepp et al. | |
| 10,439,877 B2 | 10/2019 | Kachalia et al. | |
| 10,447,825 B2 | 10/2019 | Bhagwat et al. | |

(Continued)

FOREIGN PATENT DOCUMENTS

CN    103973830 A    8/2014

OTHER PUBLICATIONS

Kang, J. et al., "Towards Agents and Ontology for Cloud Service Discovery," IEEE, Oct. 2011, pp. 483-490, http://citeseerx.ist.psu.edu/viewdoc/download?doi=10.1.1.571.3324&rep=rep1&type=pdf.

(Continued)

*Primary Examiner* — Zi Ye
(74) *Attorney, Agent, or Firm* — Hewlett Packard Enterprise Patent Department (57) ABSTRACT

Examples described herein provide network service discovery in a network. Examples herein include receiving, from a network device in the network, a set of records corresponding to a set of service advertisements indicative of capabilities of services hosted by respective host devices connected to the network device. Examples herein include determining, a set of neighbor network devices corresponding to the network device, based on radio frequency (RF) data in the network and a predefined set of policies associated with each of the set of records. Examples herein further include sending the set of records to the set of the neighbor network devices, where each of the set of neighbor network devices is to serve service discovery requests based on the set of records.

20 Claims, 5 Drawing Sheets

(56) References Cited

U.S. PATENT DOCUMENTS

| | | | | |
|---|---|---|---|---|
| 2002/0120750 A1* | 8/2002 | Nidd | ............... | H04L 67/16 |
| | | | | 709/227 |
| 2003/0217122 A1* | 11/2003 | Roese | ............... | H04L 63/08 |
| | | | | 709/219 |
| 2009/0029728 A1* | 1/2009 | Shen | ............... | H04W 48/14 |
| | | | | 455/507 |
| 2011/0153773 A1* | 6/2011 | Vandwalle | ............ | H04W 8/005 |
| | | | | 709/217 |
| 2016/0087777 A1* | 3/2016 | Ihm | ............... | H04B 17/309 |
| | | | | 370/252 |
| 2018/0375732 A1* | 12/2018 | Kachalia | ............... | H04L 67/303 |

OTHER PUBLICATIONS

Weare, K., "Amazon Introduces AWS Cloud Map: 'Service Discovery for Cloud Resources,'" Dec. 27, 2018, https://www.infoq.com/news/2018/12/AWS-Cloud-MAP/.

* cited by examiner

FIG. 5

NETWORK SERVICE DISCOVERY

BACKGROUND

Networks may include a plurality of resources connected by communication links, and may be used to connect people, provide services (e.g., internally and/or externally via the Internet and/or intranet), and/or organize information, among other activities associated with an entity. A network may include a variety of network devices, such as access points, controllers, gateways, switches, etc., which perform different network operations, such as network access, authentication, and muting network traffic to provide connectivity. The network may include host devices (such as printers, scanners, fax machines, media streaming devices, networked projectors, surveillance systems, IP phones, etc.) which may host different service functionalities to be accessed by client devices (such as computers, laptops, handheld devices, smartphones, etc.) in the network.

Network service discovery (NSD) includes detection of host devices and services offered by those host devices on a computer network. NSD requires a common language and/or protocol to enable network devices to make use of services hosted by the host devices without the need of continuous user intervention and aims to reduce the configuration efforts from users/network administrators. NSD also allows applications to access services that host devices provide on a local network.

BRIEF DESCRIPTION OF THE DRAWINGS

Various features and advantages of the invention will become apparent from the following description of examples of the invention, given by way of example only, which is made with reference to the accompanying drawings, of which.

DETAILED DESCRIPTION

As discussed above, NSD is the detection of host devices and services offered by those host devices on a network, such a wired Local Area Network (LAN) or a wireless LAN. In an example, NSD may be utilized in Zero-configuration (Zeroconf) networking to reduce manual intervention of administrators or users in the network. Network service protocols, such as Multicast Domain Name System (mDNS) and Simple Search Discovery Protocol (SSDP), generally allow sending discovery messages as multicast/broadcast traffic on connected links between nodes in a network. For instance, for NSD via mDNS, a client device sends a mDNS query message for service discovery to all host devices in the network to request a service. Then, each host responds to the client with a mDNS query response message, even if it does not offer the requested service. These multicast query messages and corresponding multicast response messages may lead to flooding in the network. Similar issues of flooding may also be observed during NSD via use of SSDP. Further, multicast messaging in a wireless medium is subject to low reliability, low data rates, high interference and high power consumption. Some network topologies may also not be conducive to multicast/broadcast messaging.

In some network architectures, such as a swarm architecture, the issue of flooding due to multicast packet exchange may be partly addressed. For instance, in a swarm architecture, all network devices in the swarm may be deployed in the same management virtual LAN (VLAN). The network devices generally maintain a database of service advertisements indicative of service functions provided by host devices connected to corresponding network devices. A network device receiving a service discovery request from a client device, may communicate the service discovery request to other network devices in the swarm using broadcast messages, since all the network devices are in the same management VLAN. All the network devices, in response to receiving the broadcasted service discovery request, may check with respective lists of service advertisements to identify a service matching the service discovery request. Since, the network devices process the service discovery requests based on the service advertisements, the service discovery requests may not be forwarded to each host device. Thus, the multicast packets exchanged with the host devices may be eliminated or reduced. In other words, the network devices may function as proxy to enable service discovery and may consequently reduce the overall multicast traffic in the network. However, in some network architectures the network devices may be in different management VLANs and subnets and may be reachable only through Internet Protocol (IP) configured routing. In such network architectures, where the network devices are in different VLANs or subnets, NSD generally occurs via mDNS or SSDP and issues of flooding the network with multicast query and response messages may still exist.

Further, in some network architectures having a WLAN controller, the issue of flooding due to multicast packet exchange may be partly addressed. For instance, a network architecture may include a WLAN controller that manages a cluster of network devices. The network devices generally maintain a database of service advertisements indicative of service functions provided by host devices connected to corresponding network devices. A combination of the service advertisements from all the network devices in the cluster may be stored in a database of the WLAN controller. A service discovery request received by a network device may be forwarded to the WLAN controller. The WLAN controller may check its database of service advertisements to find a service matching the service discovery request and based on the match, may direct the discovery request to a network device connected to a host device hosting the matching service. Thus, multicast packet exchange between network devices in the cluster may be reduced. In other words, the WLAN controller may function as a proxy to serve the service discovery request, consequently reducing the overall multicast traffic in the network. However, in some example network architectures, a WLAN controller may not be deployed. In such network architectures, in absence of a WLAN controller, NSD generally occurs via mDNS/SSDP and issues of flooding the network with multicast query and response messages may still exist, consequently reducing overall data rates and resulting in increased interference.

The present disclosure relates to service discovery in a network, where service advertisements received by a network device connected to a host device are used to serve service discovery requests by neighbor network devices, consequently facilitating in reduction or elimination of multicast service discovery requests. According to the present disclosure, a set of records corresponding to a set of service advertisements is received by a network manager from a network device in the network. In an example, the network manager is a cloud-based network management system. The set of service advertisements is indicative of capabilities of services hosted by respective host devices connected to the network device. A set of neighbor network devices corresponding to the network device is determined based on radio frequency (RF) data in the network and a predefined set of policies associated with each of the set of records. The set of records are sent to the set of the neighbor network devices. Each of the neighbor network devices serve service discovery requests based on the set of records.

In the present disclosure, since relevant service advertisements are shared with a specific set of neighbor APs based on predefined policies, it facilitates to avoid multicasting/broadcasting of all service advertisements to each network device in the network. This enables reduction or elimination of multicast network traffic and may prevent flooding of the network. Also, service discovery requests received by a network device may be served by the network device based on its local database, thereby avoiding multicasting/broadcasting of the service discovery requests, which further facilitates in reducing multicast traffic, consequently preventing flooding. The reduction or elimination of multicast traffic may enhance data rates and reduce interference in the network. Also, the present disclosure enables NSD in all types of network topologies, even in absence of a WLAN controller and with the network devices being grouped in different subnets/VLANs, without multicasting the service advertisements or service discovery requests.

In examples described herein, a "packet" (i.e., network packet) refers to a formatted unit of data which may be transmitted across one or more communication links of one or more networks. According to the OSI model, a packet refers to a protocol data unit (PDU) at the Layer 3 (L3) network layer. Moreover, under the Transmission Control Protocol/Internet Protocol (TCP/IP), a packet (i.e., IP packet) may comprise an IP header. An IP header comprises a source IP address and a destination IP address. In some examples, a packet may comprise a header and a payload. In such examples, an IP header may comprise control information for delivering the payload, such as source and destination information, sequencing information, service information, flagging information, other transmission-related information, or the like, or a combination thereof. In some examples, the payload may comprise data which is carried by the packet. It will be understood by one skilled in the art that a packet may comprise any suitable format(s) of units of data, now known or later developed.

In examples described herein, a "subnet" (i.e., IP subnet) refers to a logical partition of an IP network. A subnet comprises one or more IP addresses. A subnet may be characterized by its subnet mask (i.e., netmask), which is a bitmask that, when applied by a bitwise AND operation to any IP address in a network, yields a routing prefix for an IP network.

In examples described herein, a network device may engage in any network data transmission operations, including, but not limited to, switching, routing, bridging, or a combination thereof. In some examples, a network device may comprise a wireless access point (WAP). A WAP refers to receiving points for any known or convenient wireless access technology which may later become known. Specifically, the term WAP is not intended to be limited to IEEE 802.11-based WAPs. A WAP generally functions as an electronic device that is adapted to allow wireless devices to connect to a wired network via various communications standards. A WAP may include any necessary hardware components to perform the inventions disclosed herein, including, but not limited to: processors, memories, display devices, input devices, communications equipment, etc. It will be understood by one of ordinary skill in the art that network device may be any suitable type(s) of network devices made by any suitable manufacturer(s). A WAP may include one or more network interfaces. A network interface may comprise a network interface controller (NIC) having one or more ports (e.g., Ethernet ports), one or more sockets, one or more adapters, or a combination thereof. In addition, a network interface may comprise a radio having a specific MAC address. In some examples, one or more basic service set identifiers (BSSIDs) may correspond to the MAC address of a radio of a network interface. In some examples, a radio may operate at one or more frequency bands. For example, a radio may operate at a 5 GHz band which conforms to the IEEE 802.11ac standard, a 2.4 GHz band which conforms to one or more of the IEEE 802.11ac, 802.11n, and 802.11g standards, or a combination thereof. Each of the frequency bands may be divided into multiple WLAN channels. For example, the 2.4 GHz band may be divided into 11 channels and the 5 GHz band may be divided into 45 channels. It will be understood by one skilled in the art that a radio of a network interface may transmit and receive wireless signals that conform to any suitable type(s) of wireless communications standard(s), now known or later developed, and/or operate at any suitable frequency range (s).

In examples described herein, a host device is a computing entity that can be accessed by clients and that can host different services (such as streaming radio and/or video services, cable and/or satellite television services, multimedia streaming service, printer service, etc.) for the clients. The host device may accept connections from clients who request a service function provided by the host device. The host device may be a computer, a device, or a program that may serve a client to which they provide some functionality. The host device may be connected to a network device, such as an access point, switch, router, etc. The client can connect to the network device to access the features and services (printing, web streaming, accessing websites, etc.) provided by the host device. Examples of the host device include networked imaging devices (such as printers, scanners, fax machines, etc.), media streaming devices, networked projectors, surveillance systems, IP phones, etc.

In examples described herein, a record is a group of related data held within the same structure. In an example, a set of records may be stored in a relational database. A record is a grouping of fields within a table that reference one particular object. In an example, a record may be included in a mDNS response packet. The mDNS response packet includes two parts—the header and the data. The data part includes queries, answers, authoritative-nameservers, and additional records. All records in the answers, authoritative-nameservers, and additional records sections have the same format and are collectively known as Resource Records (RR). The resource records include a RRNAME indicating the name of the node to which the record persists, a RRTYPE indicating a type of the resource record, such as Name Server (NS), text (txt), etc., CACHE-FLUSH indicating whether outdated cached records shall be purged, RRCLASS in which "IN" indicates Internet and IP networks, TTL indicating a time period for which the RR is valid, RRLENGTH indicating a length of the resource data (RDATA) field, RDATA has an internal structure that varies by the RRTYPE. In some examples, the records may be included in SSDP notify packets.

In examples described herein, host devices may advertise capabilities of its hosted services to a connected network device through mDNS response packets or SSDP notify packets. Thus, a set of records, such as mDNS/SSDP records, corresponding to service advertisements indicative of capabilities of services hosted by respective host devices connected to the network device may be created and stored in the network devices.

Figure 1:
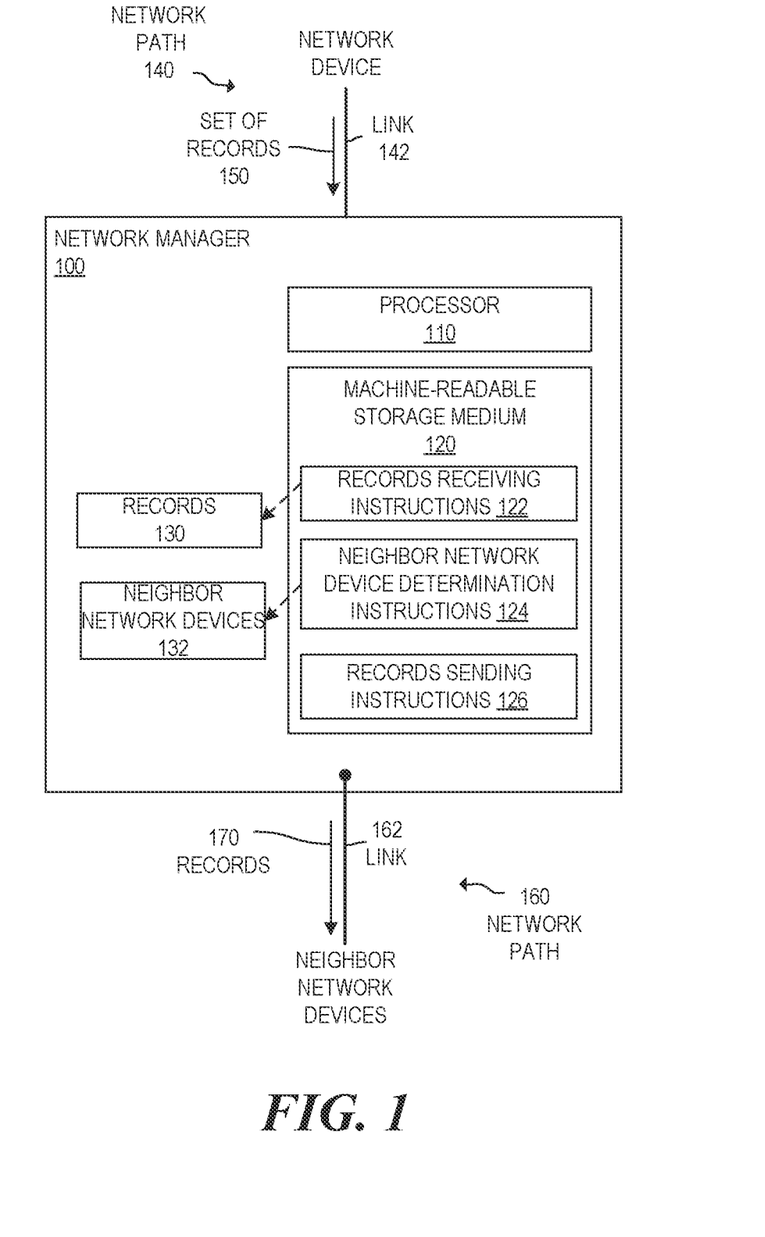
FIG. 1 is a block diagram of a network manager for network service discovery.

Referring now to the drawings, FIG. 1 is a block diagram of an example network manager 100 for enabling NSD in a network. Network manager 100 includes a processor 110 and machine-readable storage medium 120 comprising (e.g., encoded with) at least records receiving instructions 122, neighbor access point determination instructions 124, and records sending instructions 126 that are executable by the processor 110 to implement functionalities described herein in relation to the records receiving instructions 122, neighbor access point determination instructions 124, and records sending instructions 126. In addition, network manager 100 may gather network operating information from various nodes of one or more networks, including network traffic load information, network topology information, network usage information, etc. Furthermore, network manager 100 may transmit commands to various nodes of the one or more networks to alter network topology and routing to achieve various network efficiency and efficacy goals. It will be understood by one of ordinary skill in the art that network manager 100 may comprise any suitable type(s) of computing device(s) for facilitating NSD. Moreover, the network manager 100 may comprise one or more cloud-based resources (e.g., a cloud server).

Moreover, network manager 100 may include any necessary hardware components to perform the inventions disclosed herein, including, but not limited to: processors, memories, display devices, input devices, communications equipment, etc.

In the example of FIG. 1, network manager 100 may be a cloud-based network management system for real-time management of wireless, wide area network (WAN), and wired networks with WAPs, gateways, and switches. The cloud-based network manager may be involved in monitoring, configuration, client troubleshooting, role detection, guest management, reports and application usage. Multiple clusters of network devices may be monitored and managed by the network manager 100. In some examples, the network manager 100 may be implemented in a Software-as-a-Service (SaaS) platform. Along with device and network management functions, the network manager 100 may offers value-added services such as customized guest access, client presence, service assurance analytics, network inventory management, subscriptions, user access and other functions. The network manager 100 can also provision tenant accounts, allocate devices, assign subscriptions, and monitor tenant accounts. The network manager 100 also allows administrators to look into a specific tenant account and perform additional administration and configuration tasks.

In the example of FIG. 1, the network manager 100 may be configured (e.g., encoded with instructions executable by the processor 110) to receive a set of records 150 via network path 140. Network path 140 may include any suitable communication link 142 (e.g., wired or wireless, direct or indirect, etc.) between network manager 100 and a network device (e.g., access point, switch, router, gateway, controller, etc.) in a network. In examples described herein, a "network path" may include a combination of hardware (e.g., communications interfaces, communication links, etc.) and instructions (e.g., executable by a processing resource) to communicate (e.g., receive, send, etc.) records with an external resource (server, access point, switch, gateway, controller, etc.) connected to the network.

The set of records 150 may include information relating to a host name, service name, type of service, service capability information, service expiry information (such as Time to Live (TTL)), class of service, etc. In an example, the set of records may be included in mDNS response packets and/or in SSDP notify packets.

In the example of FIG. 1, records receiving instructions 122, when executed by the processor 110, may receive the set of records 150 corresponding to a set of service advertisements indicative of capabilities of services hosted by respective host devices connected to the network device.

In the example of FIG. 1, record receiving instructions 122 may comprise instructions to parse service advertisements from respective host devices connected to the network device into a platform agnostic model and to extract the set of records corresponding to each of the service advertisements from the platform agnostic model. In examples described herein, a "platform agnostic model" refers to a data structure that can provide record data of service advertisements from various host devices (e.g., different types of host devices, etc.) to network manager 100. In some examples, one or more configuration texts received from one or more of the respective host devices may be parsed to obtain the set of records.

In the example of FIG. 1, record receiving instructions 122 may comprise instructions to store the set of records in a database of the network manager 100. The record receiving instructions 122, when executed by the processor 110, may create the database of the set of records. The set of records is stored in the database in a parsed format. In an example, a cache of the records 130 may be created by the record receiving instructions 122 and the set of records may be stored in the cache. The cache may be, for example, a hazelcast cache. The hazelcast approach to database caching includes storing frequently accessed data in memory across an elastically scalable data grid. This enables any network of machines to dynamically cluster and pool both memory and processors to accelerate application performance. In an example, hash-based identifiers corresponding to each of the set of records may also be obtained. The record receiving instructions 122 may comprise instructions to implement a hashing function, such as Secure Hashing Algorithm (SHA) 1, on the set of records. The hash-based identifiers corresponding to the set of records may be stored in the database along with the set of records. The hash-based identifiers may be referred to as a first set of hash-based identifiers.

In the example of FIG. 1, neighbor network device determination instructions 124, when executed by processor 110, may determine (e.g., compute), a set of neighbor network devices corresponding to the network device to which the respective host devices are directly connected. In some examples, a "neighbor network device" may be a network device in the same tenant account as that of the network device to which the respective host devices are directly connected. The neighbor network devices may be connected to the network device over an IP network. The set of neighbor network devices is determined based on radio frequency (RF) data in the network and a predefined set of policies associated with each of the set of records. In some examples, the RF data includes information regarding Basic Service Set Identifiers (BSSIDs) of the network devices, information on WLAN radio channel(s), frequency bands, signal-to-noise ratio (SNR), etc., used by the radios of the network devices. The RF data may be analyzed by a neighbor discovery service (not shown in FIG. 1) to identify a set of network devices which are wirelessly accessible to the network device to which the respective host devices are connected. In an example, the neighbor discovery service may provide Adaptive Radio Management (ARM) by utilizing Artificial Intelligence/machine learning to provide automated RF optimization.

The neighbor discovery service may analyze periodic RF data across the entire network, or a subset of the network (e.g. a controller cluster), to algorithmically derive configuration changes for every network device on the network. In addition, the neighbor discovery service may enable automated RF network optimization via machine learning, dynamic bandwidth adjustments by changing device density, enhanced roaming using an even distribution of EIRP to radios, real-time channel assignments to mitigate co-channel interference, expanded RF awareness with peer comparisons, etc. The neighbor discovery service may be deployed in a cloud-based infrastructure of the network manager 100. In an example, neighbor network device determination instructions 124, when executed by processor 110, may access the neighbor discovery service to identify the set of network devices which are wirelessly accessible to the network device to which the respective host devices are connected. In an example, the network devices wirelessly accessible to the network device connected to the respective host devices may be located in a physical vicinity of the network device.

In the example of FIG. 1, in response to identifying the network devices which are wirelessly accessible by the network device to which the respective host devices are connected, neighbor network device determination instructions 124, may determine the set of neighbor network devices based on the predefined set of policies. The predefined set of policies are based on a physical location of each of the set of neighbor network devices. The physical location is based on information indicative of a site name, a building name, and a floor number where each of the set of neighbor network devices are installed. In an example, the information indicative of a site name, a building name, and a floor number may be derived from respective BSSIDs of each network device. Based on the BSSIDs and SNR levels of the network devices which are wirelessly accessible by the network device to which the respective host devices are connected, the neighbor network device determination instructions 124 may identify a site name, a building name, and a floor number corresponding to each of the network devices. In an example, wirelessly accessible network devices having the site name, building name, and floor number matching with those of the network device to which the respective host devices are connected, may be determined as the set of neighbor network devices. In an example, the neighbor network device determination instructions 124 may identify the wirelessly accessible network devices with SNR levels that exceed a predetermined threshold. Also, the neighbor network device determination instructions 124 may identify the wirelessly accessible network devices having BSSIDs which match a predefined set of BSSIDs stored in the network device connected to the respective host devices. The wirelessly accessible network devices having the matching BSSIDs and SNR levels above the predetermined threshold may be identified as the set of neighbor network devices.

In some examples, a role-based privilege may be associated with at least one of the set of records. For example, a multimedia streaming service may be allowed for employees of executive role or above. Thus, the set of records corresponding to the multimedia streaming service may be associated with role-based privilege information. In an example, the neighbor determination instructions 124 may identify the set of neighbor network devices based on a combination of the physical location and the role-based privilege.

In the example of FIG. 1, network manager 100 may be configured (e.g., encoded with instructions executable by at least one processor 110) to send (e.g., transmit) records 170 via network path 160 to the set of neighbor APs. Network path 160 may include any suitable communication link 162 (e.g., wired or wireless, direct or indirect, etc.) between network manager 100 and the set of neighbor APs. In examples described herein, a "network path" may include a combination of hardware (e.g., communications interfaces, communication links, etc.) and instructions (e.g., executable by a processing resource) to communicate (e.g., receive, send, etc.) a command/data (e.g., records 170) to one or more neighbor network devices as determined by neighbor network device determination instructions 124. In an example, based on (e.g., in response to) receiving the set of the records 170, each of the set of neighbor network devices may create a local cache for the set of records 170. Moreover, based on (e.g., in response to) the set of records 170 stored in their respective local caches, each of the set of neighbor network devices may serve service discovery requests received by each of the set of neighbor APs.

In this manner, the set of records from the network device to which the respective host devices are connected are also shared with the set of neighbor network devices which may serve service discovery requests based on the records stored locally, without sending multicast packets of the service discovery request to every network device in the network. Thus, NSD is managed locally by each of the network devices, without multicast/broadcast of service discovery packets/service advertisements. Thus, multicast data packets in the network may be reduced, consequently reducing or eliminating flooding in the network and thereby increasing network reliability and data rates.

Figure 2:
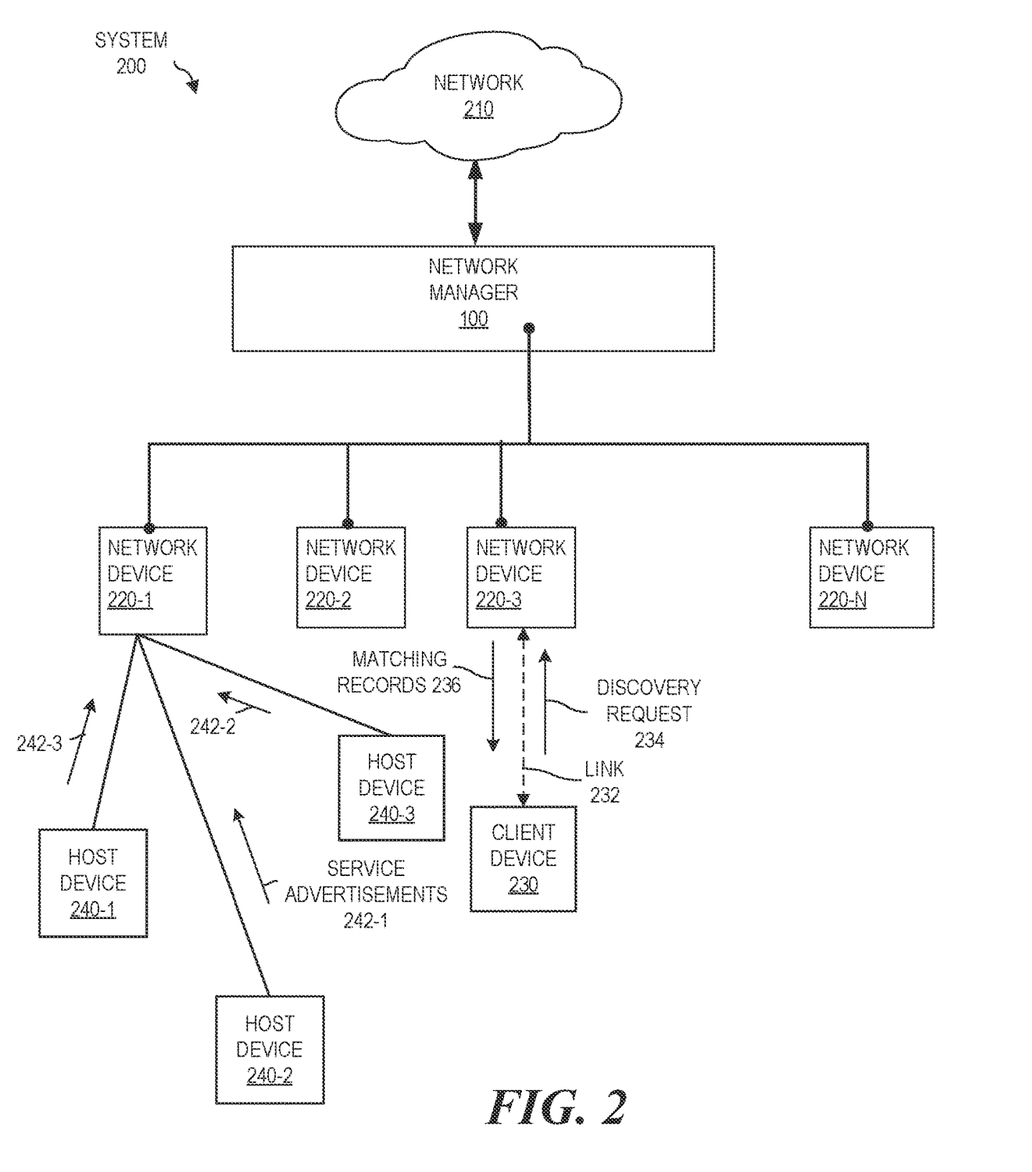
FIG. 2 is a block diagram of an example system for network service discovery.

FIG. 2 is a block diagram of an example system 200 for NSD. System 200 may include network manager 100, as described above in relation to FIG. 1.

In the example of FIG. 2, system 200 may comprise a network 210, wherein network manager 100 is connected to network 210. In some examples, network 210 is a software defined network (SDN). Network 210 may comprise one or more LANs, VLANs, WLANs, virtual private networks (VPNs), WANs, the Internet, or the like, or a combination thereof. As used herein, a "wide area network" or "WAN" may comprise, for example, a wired WAN, wireless WAN, hybrid WAN, software-defined WAN (SD-WAN), or a combination thereof. Moreover, network 210 may comprise one or more cellular networks using one or more mobile communications standards (e.g., 3G, 4G, 5G, etc.). It will be understood by one skilled in the art that system 200 may comprise any suitable type(s) of network(s), now known or later developed. In an example, the network manager 100 may be implemented on cloud-based resources deployed in the network 210.

In the example of FIG. 2, system 200 may comprise a plurality of network devices 220-1 to 220-N connected to network manager 100. Each of network devices 220-1 to 220-N may comprise a managed switch (i.e., switches managed by network manager 100) or managed wireless access point (WAP) (i.e., WAPs managed by network manager 100) which supports data link layer switching (i.e., Layer 2 switching), IP layer routing (i.e., Layer 3 routing), or a combination thereof. Moreover, each of network devices 220-1 to 220-N may comprise stackable or stand-alone type switches, power over Ethernet (PoE) or non-PoE type switches, modular or fixed configuration (i.e. fixed configuration Ethernet) type switches, etc. It will be understood by one skill in the art that each of network devices 220-1 to 220-N may be any suitable type(s) of access points or switches, now known or later developed.

In the example of FIG. 2, system 200 may comprise a client device 230. The client device 230 is connected to the network device 230-3 via a communication link 232 (e.g., wired or wireless, direct or indirect, etc.) between the network device 230-3 and the client device 240. In examples described herein, a "link" may include a combination of hardware (e.g., communications interfaces, communication links, etc.) and instructions (e.g., executable by a processing resource) to communicate (e.g., receive, send, etc.) with an external resource (access point, switch, gateway, controller, etc.) connected to the network. The client device 230 may send service discovery requests to the network device 220-3 via the link 232. Although in FIG. 2, a single client device 230 is shown to be connected to a network device, system 200 may comprise multiple client devices connected to one or more network devices.

Network device 220-3 provides network connectivity to the client device 230. Examples of client devices may include: desktop computers, laptop computers, mainframes, tablet computers, e-readers, netbook computers, televisions and similar monitors (e.g., smart TVs), content receivers, set-top boxes, personal digital assistants (PDAs), mobile phones, smart phones, smart terminals, virtual terminals, video game consoles, virtual assistants, Internet of things (IoT) devices, and the like.

In the example of FIG. 2, system 200 may comprise host devices 240-1 to 240-3. Host devices 240-1 to 240-3 may include various providers of multimedia downloadable and/or streaming content, including audio, video, graphical, and/or text content, or any combination thereof. Examples of the host devices 240-1 to 240-3 include, for example, print servers, web servers, streaming radio and/or video providers, cable and/or satellite television providers, or a combination thereof. The client device 230 may request to discover and access the multimedia services provided by the host devices 240-1 to 240-3. Although in FIG. 2, three host devices' are shown to be connected to the network device 220-1, system 200 may comprise any suitable number of host devices connected to each of the network devices 220-1 to 220-N.

In the example of FIG. 2, the network device 220-1 receives a set of service advertisements 242-1 to 242-3 from a set of host devices 240-1 to 240-3 connected to the network device 220-1. The set of service advertisements is indicative of capabilities of services hosted by the respective host devices 240-1 to 240-3. The network device 220-1 may create a local cache of a set of records corresponding to the set of service advertisements 242-1 to 242-3. In an example, the set of records are obtained by parsing the set of service advertisements and then the parsed set of records are stored in the local cache. In an example, the local cache may be, for example, a hazelcast cache. The hazelcast approach to caching includes storing frequently accessed data in memory across an elastically scalable data grid. This enables any network of machines to dynamically cluster and pool both memory and processors to accelerate application performance. In an example, hash-based identifiers corresponding to each of the set of records may also be obtained by implementing a hashing function, such as SHA-1, on the set of records. The hash-based identifiers corresponding to the set of records may be stored in the database along with the set of records. The network device 220-1 may then send the set of records to the network manager 100.

In the example of FIG. 2, the network manager 100 receives the set of records from the network device 220-1 to which the respective host devices 240-1 to 240-3 are connected. The network manager 100 may create a database of the set of records, where the set of records is stored in the database in a parsed format. Further, the database may also include a set of hash-based identifiers corresponding to the set of records.

In the example of FIG. 2, the network manager 100 determines a set of neighbor network devices corresponding to the network device 220-1, based on RF data in the network and a predefined set of policies associated with each of the set of records. The RF data includes channel information and SNR information corresponding to a plurality of network devices 220-1 to 220-N in the network.

In some examples, the RF data includes information regarding Basic Service Set Identifiers (BSSIDs) of the network devices 220-1 to 220-N, information on WLAN radio channel(s), frequency bands, SNR, etc., used by the radios of the network devices 220-1 to 220-N. The channel information may include, for example, information on the WLAN radio channel(s) and frequency bands used by the radios of the network devices 220-1 to 220-N. In an instance, a radio may operate at a 5 GHz frequency band which conforms to the IEEE 802.11ac standard, where the 5 GHz frequency band may be divided into 45 WLAN radio channels. The network manager 100 may determine the set of neighbor network devices 220-2 and 220-3 depending on the channel information of those network devices such that there is no interference. In some examples, the network manager 100 may determine the set of neighbor network devices 220-2 and 220-3 operating in the same frequency band as that of the network device 220-1. In other words, the network device 220-1 and the set of neighbor network devices 220-2 and 220-3 may operate in an identical frequency band. Thus, the RF data may be analyzed by a neighbor discovery service to identify a set of network devices which are accessible to the network device 220-1 to which the respective host devices 240-1 to 240-3 are connected.

In the example of FIG. 2, network devices 220-2 and 220-3 are accessible by (i.e., within the wireless signal range of) the network device 220-1. In response to identifying that the network devices 220-2 and 220-3 are wirelessly accessible by the network device 220-1, the network manager 100, may determine the set of neighbor network devices based on the predefined set of policies. The predefined set of policies are based on a physical location of each of the set of neighbor network devices. The physical location may be indicated by a site name, a building name, and a floor number where each of the set of neighbor network devices are installed. In an example, the information indicative of a site name, a building name, and a floor number may be derived from respective BSSIDs of each network device. Based on the BSSIDs and SNR levels of the network devices 220-2 and 220-3 which are wirelessly accessible to the network device 220-1, the network manager 100 may identify a site name, a building name, and a floor number corresponding to each of the network devices 220-2 and 220-3. For instance, consider that the network devices 220-1 to 220-3 are installed in an identical site, building, and floor. In such instance, the network manager 100 determines network devices 220-2 and 220-3 as the set of neighbor network devices corresponding to the network device 220-1.

In the example of FIG. 2, in response to determining the network devices 220-2 and 220-2 as the set of neighbor network devices corresponding to the network device 220-1, the network manager 100 sends the set of records corresponding to the set of service advertisements 242-1 to 242-3 to the set of the neighbor network devices 220-2 and 220-3.

In the example of FIG. 2, the set of neighbor network devices 220-2 and 220-3 receive the set of records form the network manager 100. Each of the set of neighbor network devices 220-2 and 220-3 may create a local cache of the set of records. Each of the set of neighbor network devices 220-2 and 220-3 can serve service discovery requests based on the set of records.

In the example of FIG. 2, the neighbor network device 220-3 may receive a service discovery request 234 from client device 230. The service discovery request 234 may include service information indicative of a service name, service type, subscription information, service code, access credentials, etc., for a service which the client device 230 attempts to access. Examples of the service may include streaming radio and/or video services, cable and/or satellite television services, multimedia streaming service, printer service, etc.

In the example of FIG. 2, in response to receiving the service discovery request 234, the neighbor network device 220-3 may determine a subset of the records 236 that match the service discovery request. The neighbor network device 220-3 may compare the service information with the set of records stored in its local cache to obtain the subset of the records that match the service discovery request.

In the example of FIG. 2, the neighbor network device 220-3 may send information relating to the subset of records to the client device 230. The information relating to the subset of record may be sent as response packets to the service discovery request. The response packets may be forwarded using Internet Protocol (IP) or any other suitable protocol. Thus, the neighbor network device 220-3 serves service discovery requests based on the set of records received from the network manager 100.

In the example of FIG. 2, host devices 240-1 to 240-3 may provide a new service or may discontinue a service. Also, some services may get expired. Further, a new host device may connect to the network device 220-1 which may start advertising its services to the network device 220-1. Thus, the set of service advertisements 242-1 to 242-3 may be updated over time or new service advertisements may be added to the set. The network device 220-1 may receive an updated set of service advertisements (not shown) from the host devices 240-1 to 240-3. The network device 220-1 may determine a differential set of records based on a comparison of the set of service advertisements 242-1 to 242-3 and the updated set of service advertisements. The network device 220-1 may compare hash-based identifiers of records corresponding to the set of service advertisements 242-1 to 242-3 with hash-based identifiers of records corresponding to the updated set of service advertisements to obtain the differential set of records. The network device 220-1 then sends (i.e., transmits) the differential set of records to the network manager 100. The network manager 200 may update its database based on the differential set of records and send the differential set of records to the set of neighbor network device 220-2 and 220-3. Each of the neighbor network devices 220-2 and 220-3 may update their respective local caches based on the differential set of records. Thus, the neighbor network devices 220-2 and 220-3 may serve service discovery requests based on the updated set of records.

In the example of FIG. 2, the network manager 100 may be subjected to a failure due to faults in the compute infrastructure supporting the network manager 100 or due to disruption in communication and/or connectivity between the network manager 100 and the network devices 220-1 to 220-N. Subsequent to a failure in the network manager 100, the network device 220-1 connected to the set of host devices 242-1 to 242-3 may receive an updated set of service advertisements from the set of host devices 242-1 to 242-3. The network device 220-1 may determine an updated set of records corresponding to the updated set of service advertisements. The updated set of records may be obtained by parsing the updated set of service advertisements. The network device 220-1 determines a hash-based identifier for each of the updated set of records. The updated set of records and corresponding hash-based identifiers are stored in the local cache of the network device 220-1.

In the example of FIG. 2, based on (e.g., in response to) recovery of the network manager 100 from the failure, the network device 220-1 sends the hash-based identifiers corresponding to the updated set of records to the network manager 100. Moreover, based on (e.g., in response to) recovery of the network manager 100 from the failure, the network manager 100 may send a notification message to the network devices 220-1 to 220-N notifying that the network manager 100 has recovered from the failure. Furthermore, based on (e.g., in response to) receiving the notification message, the network device 220-1 sends the hash-based identifiers corresponding to the updated set of records to the network manager 100.

In the example of FIG. 2, the network manager 100 receives the hash-based identifiers, also referred to as the second set of hash-based identifiers, corresponding to the updated set of records from the network device 220-1. The network manager 100 determines a differential set of records based on a comparison of the second set of hash-based identifiers with a first set of hash-based identifiers stored in the database of the network manager 100 prior to the failure. The network manager 100 sends a request for the differential set of records to the network device 220-1. Based on (e.g., in response to) receiving the differential set of records from the network device 220-1, the network manager 100 updates its database using the differential set of records. Thus, the database of the network manager 100 also includes the updated set of records as maintained in the network device 220-1. The network manager 100 then sends the differential set of records to the set of neighbor network devices 220-2 and 220-3. The neighbor network devices 220-3 and 220-3 update their respective local caches based on the differential set of records. Thus, the neighbor network devices 220-2 and 220-3 may serve service discovery requests based on the updated set of records, though the records were updated while the network manager 100 was subjected to the failure. Thus, NSD in the present disclosure is resilient to failures in the network manager 100.

Figure 3:
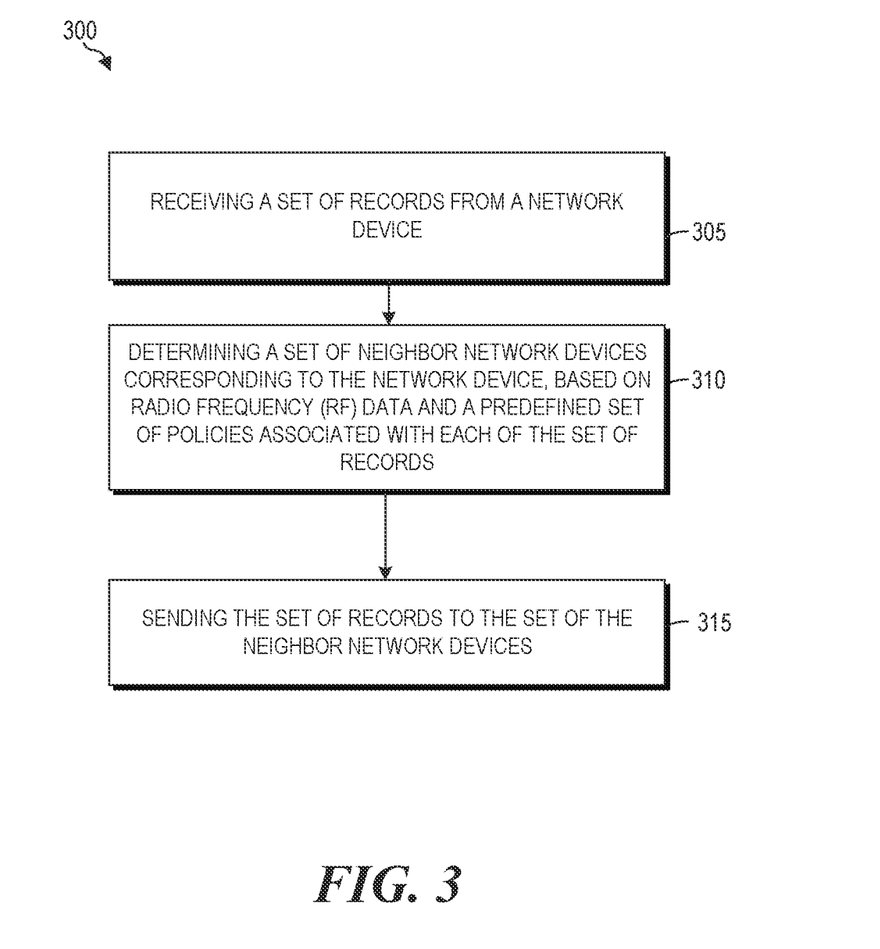
FIG. 3 shows an example functionality for network service discovery.

FIG. 3 shows an example functionality 300 for NSD in a network. Functionality 300 may be implemented as a method or may be executed as one or more instructions on a machine (e.g., by at least one processor), where the one or more instructions are included on at least one machine-readable storage medium (e.g., a non-transitory machine readable-storage medium.) While only three blocks are shown in functionality 300, functionality 300 may include other actions described herein. Additionally, although the blocks are shown in an order, blocks depicted in FIG. 3 may be performed in any order and at any time. Also, some of the blocks shown in functionality 300 may be omitted without departing from the spirit and scope of this disclosure. Functionality 300 may be implemented on a network manager according to any of the examples herein.

As shown in block 305, functionality 300 includes receiving, by a network manager, such as the network manager 100 and from a network device, such as the network device 220-1, a set of records corresponding to a set of service advertisements indicative of capabilities of services hosted by respective host devices connected to the network device. In an instance, the functionality 300 may include creating, by the network manager, a database of the set of records, where the set of records is stored in the database in a parsed format and the database includes a first set of hash-based identifiers corresponding to the set of records. In an instance, the first set of hash-based identifiers may be obtained from a hashing operation performed on each of the set of records.

As shown in block 310, functionality 300 includes determining, by the network manager, a set of neighbor network devices corresponding to the network device. The neighbor network devices are determined based on RF data in the network and a predefined set of policies associated with each of the set of records. In an instance, the RF data includes channel information and SNR information corresponding to a plurality of network devices in the network. The predefined set of policies are based on one of a physical location of each of the set of neighbor network devices, a role-based privilege associated with at least one of the set of records, and a combination thereof. In an instance, the physical location is based on information indicative of a site name, a building name, and a floor number where each of the set of neighbor network devices are installed.

As shown in block 315, functionality 300 includes sending, by the network manager, the set of records to the set of the neighbor network devices, where each of the set of neighbor network devices is to serve service discovery requests based on the set of records. In an instance, functionality 300 may include, based on (e.g., in response to) recovery of the network manager from a failure, receiving, from the network device, a second set of hash-based identifiers corresponding to an updated set of records. The updated set of records and the second set of hash-based identifiers are stored in a local cache of the network device. Functionality 300 may include determining a differential set of records based on a comparison of the first set of hash-based identifiers and the second set of hash-based identifiers and sending, by the network manager and to the network device, a request for the differential set of records. Functionality 300 may further include, based on (e.g., in response to) receiving the differential set of records, updating, by the network manager, the database based on the differential set of records. The differential set of records may be sent (i.e., transmit) to the set of neighbor network devices.

Figure 4:
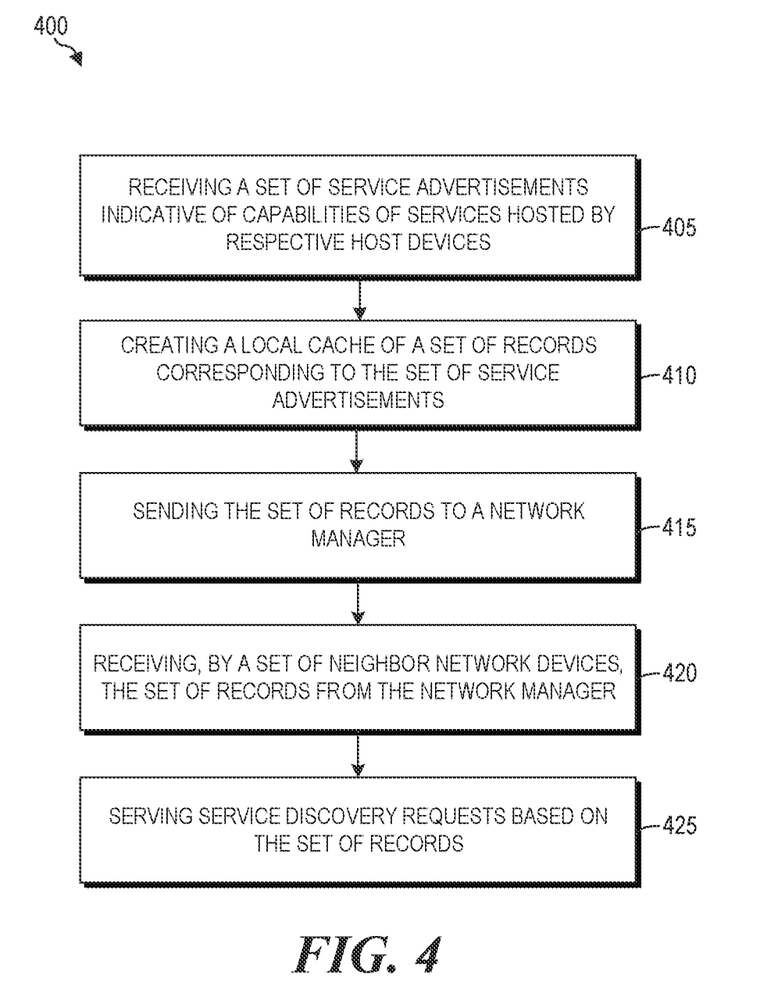
FIG. 4 shows another example functionality for network service discovery.

FIG. 4 shows an example functionality 400 for NSD. Functionality 400 may be implemented as a method or may be executed as one or more instructions on a machine (e.g., by at least one processor), where the one or more instructions are included on at least one machine-readable storage medium (e.g., a non-transitory machine readable-storage medium.) While only five blocks are shown in functionality 400, functionality 400 may include other actions described herein. Additionally, although the blocks are shown in an order, blocks depicted in FIG. 4, may be performed in any order and at any time. Also, some of the blocks shown in functionality 400 may be omitted without departing from the spirit and scope of this disclosure. Functionality 400 may be implemented on a network device according to any of the examples herein.

As shown in block 405, functionality 400 includes receiving, by a network device and from a set of host devices connected to the network device, a set of service advertisements indicative of capabilities of services hosted by respective host devices. As shown in block 410, functionality 400 includes creating, by the network device, a local cache of a set of records corresponding to the set of service advertisements. In an instance, the set of records may be obtained from the set of service advertisement through parsing.

As shown in block 415, functionality 400 includes sending the set of records to a network manager. Further, as shown in block 420, functionality 400 includes receiving, by a set of neighbor network devices corresponding to the network device and from the network manager, the set of records. The set of neighbor network devices is identified by the network manager based on a RF data in the network and a predefined set of policies associated with each of the set of records. In an example, the RF data includes channel information and SNR information corresponding to a plurality of network devices in the network. The predefined set of policies is based on one of a physical location of each of the set of neighbor network devices, a role-based privilege associated with at least one of the set of records, and a combination thereof. In an example, the physical location is based on information indicative of a site name, a building name, and a floor number where each of the set of neighbor network devices are installed.

As shown in block 425, functionality 400 includes serving, by the network device and each of the set of neighbor network devices, service discovery requests based on the set of records. In an instance, serving the service discovery requests comprises receiving, by a neighbor network device, a service discovery request from a client device, determining a subset of the records that match the service discovery request, and sending information relating to the subset of records to the client device.

In an example, functionality 400 includes receiving, by the network device and from the set of servers, an updated set of service advertisements. In an example, the service advertisements may be updated with modifications in the features of the services or expiry of certain services. Further, functionality 400 includes determining a differential set of records based on a comparison of the set of service advertisements and the updated set of service advertisements. In an instance, the differential set of records may be determined based on a comparison of hash-based identifiers corresponding to the set of service advertisements and the updated set of service advertisements. Further, functionality 400 includes sending, (i.e., transmitting) the differential set of records to the network manager. Thus, the network manager may update the database with the updated set of service advertisements.

In an example, functionality 400 includes receiving, by the network device and from the set of host devices, an updated set of service advertisements, subsequent to a failure in the network manager. Further, the functionality 400 may include determining, by the network device, an updated set of records corresponding to the updated set of service advertisements. The updated set of records may be obtained by parsing the updated set of service advertisements. Functionality 400 further includes determining, by the network device, a hash-based identifier for each of the updated set of records, where the updated set of records and corresponding hash-based identifiers are stored in the local cache of the network device.

Further, based on (e.g., in response to) recovery of the network manager from the failure, functionality 400 includes sending, by the network device, the hash-based identifiers corresponding to the updated set of records to the network manager. Functionality 400 includes sending, by the network device, a differential set of records based on (e.g., in response to) a request from the network manager, where the differential set of records is based on a comparison of the hash-based identifiers corresponding to the updated set of records and hash-based identifiers stored in a database of the network manager prior to the failure.

Figure 5:
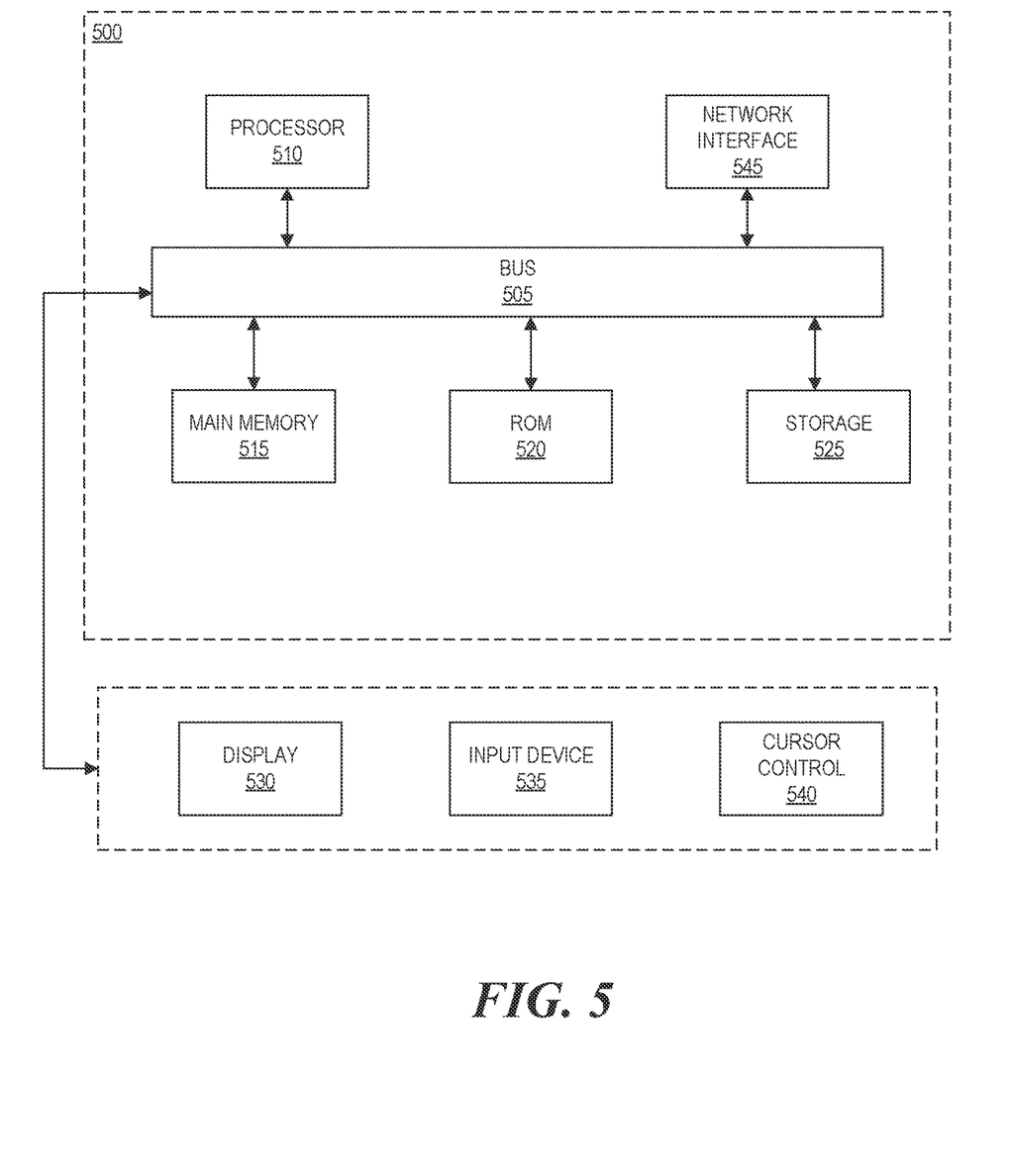
FIG. 5 is a block diagram of an example computer system for network service discovery in which various embodiments described herein may be implemented.

FIG. 5 is a block diagram of an example computer system 500 for network service discovery in which various embodiments described herein may be implemented.

Computer system 500 includes bus 505 or other communication mechanism for communicating information, at least one hardware processor 510 coupled with bus 505 for processing information. At least one hardware processor 510 may be, for example, at least one general purpose microprocessor.

Computer system 500 also includes main memory 515, such as random access memory (RAM), cache, other dynamic storage devices, or the like, or a combination thereof, coupled to bus 505 for storing information and one or more instructions to be executed by at least one processor 510. Main memory 515 also may be used for storing temporary variables or other intermediate information during execution of one or more instructions to be executed by at least one processor 510. Such one or more instructions, when stored on storage media accessible to at least one processor 510, render computer system 500 into a special-purpose machine that is customized to perform the operations specified in the one or more instructions.

Computer system 500 further includes read only memory (ROM) 520 or other static storage device coupled to bus 505 for storing static information and one or more instructions for at least one processor 510. At least one storage device 525, such as a magnetic disk, optical disk, or USB thumb drive (Flash drive), or the like, or a combination thereof, may be provided and coupled to bus 505 for storing information and one or more instructions.

Computer system 500 may further include display 530 coupled to bus 505 for displaying a graphical output to a user. The computer system 500 may further include input device 535, such as a keyboard, camera, microphone, or the like, or a combination thereof, coupled to bus 505 for providing an input from a user. Computer system 500 may further include cursor control 540, such as a mouse, pointer, stylus, or the like, or a combination thereof, coupled to bus 505 for providing an input from a user.

Computer system 500 may further includes at least one network interface 545, such as a network interface controller (NIC), network adapter, or the like, or a combination thereof, coupled to bus 505 for connecting computer system 500 to at least one network.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored on a compressed or installable format that requires installation, decompression or decryption prior to execution.) Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to at least one processor 510 executing one or more sequences of one or more instructions contained in main memory 515. Such one or more instructions may be read into main memory 515 from another storage medium, such as at least one storage device 525. Execution of the sequences of one or more instructions contained in main memory 515 causes at least one processor 510 to perform the process steps described herein. In alternative embodiments, hard-wired circuitry may be used in place of or in combination with software instructions.

In examples described herein, a "computing device" may be a server, storage device, storage array, desktop or laptop computer, switch, router, gateway, controller, access point, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 1, storage medium 120 may be implemented by one machine-readable storage medium, or multiple machine-readable storage media.

In examples described herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard disk drive (HDD)), a solid state drive, any type of storage disc (e.g., a compact disc, a DVD, etc.), or the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components. In some examples, instructions may be part of an installation package that, when installed, may be executed by a processing resource to implement functionalities described herein.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

While the present techniques may be susceptible to various modifications and alternative forms, the examples discussed above have been shown only by way of example. It is to be understood that the techniques are not intended to be limited to the particular examples disclosed herein. Indeed, the present techniques include all alternatives, modifications, and equivalents falling within the true spirit and scope of the appended claims.

In other examples, the functionalities described above in relation to instructions described herein may be implemented by one or more engines which may be any combination of hardware and programming to implement the functionalities of the engine(s). In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, a computing device may include the at least one machine-readable storage medium storing the instructions and the at least one processing resource to execute the instructions. In other examples, the engine may be implemented by electronic circuitry.

All of the features disclosed in this specification (including any accompanying claims, abstract and drawings), and/or all of the elements of any method or process so disclosed, may be combined in any combination, except combinations where at least some of such features and/or elements are mutually exclusive.

We claim:

1. A method for service discovery in a network, the network comprising a plurality of network devices, the method comprising:
   receiving, by a network manager and from a network device of the plurality of network devices, a set of records corresponding to a set of service advertisements indicative of capabilities of services provided by respective host devices connected to the network device;
   receiving, by the network manager, a first set of hash-based identifiers corresponding to the set of records;
   determining, by the network manager, a set of neighbor network devices corresponding to the network device based on radio frequency (RF) data in the network and a predefined set of policies associated with each of the set of records;
   sending, by the network manager, the set of records to the set of the neighbor network devices, wherein each of the set of neighbor network devices is to serve service discovery requests based on the set of records;
   in response to recovery of the network manager from a failure, receiving, from the network device, a second set of hash-based identifiers corresponding to an updated set of records;
   determining, by the network manager, a differential set of records based on a comparison of the first set of hash-based identifiers and the second set of hash-based identifiers; and
   sending, by the network manager, the differential set of records to the set of neighbor network devices.

2. The method of claim 1, wherein the RF data includes channel information and signal-to-noise ratio (SNR) information corresponding to the plurality of network devices.

3. The method of claim 1, wherein the predefined set of policies are based on one of a physical location of each of the set of neighbor network devices, a role-based privilege associated with at least one of the set of records, or a combination thereof.

4. The method of claim 3, wherein the physical location is based on information indicative of a site name, a building name, or a floor number where each of the set of neighbor network devices are installed, or a combination thereof.

5. The method of claim 1, further comprising:
   creating, by the network manager, a database of the set of records, wherein the database stores the set of records in a parsed format and the first set of hash-based identifiers corresponding to the set of records.

6. The method of claim 5, wherein the updated set of records and the second set of hash-based identifiers are stored in a local cache of the network device, and the method further comprising:
   sending, to the network device, a request for the differential set of records; and in response to receiving the differential set of records, updating the database based on the differential set of records.

7. A method for service discovery in a network, the network comprising a plurality of network devices, the method comprising:
receiving, by a network device of the plurality of network devices and from a set of host devices connected to the network device, a set of service advertisements indicative of capabilities of services provided by respective host devices;
creating, by the network device, a local cache of a set of records corresponding to the set of service advertisements;
sending the set of records to a network manager;
receiving, by a set of neighbor network devices corresponding to the network device and from the network manager, the set of records, wherein the set of neighbor network devices is identified based on a radio frequency (RF) data in the network and a predefined set of policies associated with each of the set of records;
serving, by the network device and each of the set of neighbor network devices, service discovery requests based on the set of records;
receiving, by the network device and from the set of host devices, an updated set of service advertisements, subsequent to a failure in the network manager;
determining, by the network device, an updated set of records corresponding to the updated set of service advertisements;
determining, by the network device, a hash-based identifier for each of the updated set of records, wherein the updated set of records and corresponding hash-based identifiers are stored in the local cache; and
in response to recovery of the network manager from the failure, sending, by the network device, the hash-based identifiers corresponding to the updated set of records to the network manager.

8. The method of claim 7, further comprising:
receiving, by the network device and from the set of host devices, an updated set of service advertisements;
determining a differential set of records based on a comparison of the set of service advertisements and the updated set of service advertisements; and
sending the differential set of records to the network manager.

9. The method of claim 7, wherein serving the service discovery requests comprises:
receiving a service discovery request from a client device;
determining a subset of the records that match the service discovery request; and
sending information relating to the subset of records to the client device.

10. The method of claim 7, wherein the RF data includes channel information and signal-to-noise ratio (SNR) information corresponding to the plurality of network devices.

11. The method of claim 7, wherein the predefined set of policies are based on one of a physical location of each of the set of neighbor network devices, a role-based privilege associated with at least one of the set of records, and a combination thereof.

12. The method of claim 11, wherein the physical location is based on information indicative of a site name, a building name, or a floor number where each of the set of neighbor network devices are installed, or a combination thereof.

13. The method of claim 7, further comprising:
sending, by the network device, a differential set of records based on a request from the network manager, wherein the differential set of records is based on a comparison of the hash-based identifiers corresponding to the updated set of records and hash-based identifiers stored in a database of the network manager prior to the failure.

14. A system comprising:
a plurality of network devices; and
a network manager comprising:
a processor; and
a memory coupled to the processor, the memory storing instructions executable by the processor to:
receive, from a network device of the plurality of network devices, a set of records corresponding to a set of service advertisements indicative of capabilities of services provided by respective host devices connected to the network device;
receive, from the network device, a first set of hash-based identifiers corresponding to the set of records;
determine, based on radio frequency (RF) data in the network and a predefined set of policies associated with each of the set of records, a set of neighbor network devices corresponding to the network device; and
send the set of records to the set of the neighbor network devices, wherein each of the set of neighbor network devices is to serve service discovery requests based on the set of records;
in response to recovery of the network manager from a failure, receive, from the network device, a second set of hash-based identifiers corresponding to an updated set of records;
determine a differential set of records based on a comparison of the first set of hash-based identifiers and the second set of hash-based identifiers; and
send the differential set of records to the set of neighbor network devices.

15. The system of claim 14, wherein the RF data includes channel information and signal-to-noise ratio (SNR) information corresponding to the plurality of network devices.

16. The system of claim 14, wherein the predefined set of policies are based on one of a physical location of each of the set of neighbor network devices, a role-based privilege associated with at least one of the set of records, or a combination thereof.

17. The system of claim 16, wherein the physical location is based on information indicative of a site name, a building name, or a floor number where each of the set of neighbor network devices are installed, or a combination thereof.

18. The system of claim 14, wherein the processor is further to:
create a database of the set of records, wherein the database stores the set of records in a parsed format and the first set of hash-based identifiers corresponding to the set of records.

19. The system of claim 18,
wherein the updated set of records and the second set of hash-based identifiers are stored in a local cache of the network device.

20. The system of claim 14, wherein one of the network device and each of the set of neighbor network devices is to:
receive a service discovery request from a client device;
determine a subset of the records that match the service discovery request; and send information relating to the subset of records to the client device.

\* \* \* \* \*